(12) United States Patent
Meiri et al.

(10) Patent No.: US 10,496,324 B2
(45) Date of Patent: Dec. 3, 2019

(54) STORAGE SYSTEM WITH CONCURRENT FAN-OUT ASYNCHRONOUS REPLICATION USING DECOUPLED REPLICATION SESSIONS

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/941,177

(22) Filed: Mar. 30, 2018

(65) Prior Publication Data

US 2019/0303010 A1   Oct. 3, 2019

(51) Int. Cl.
  *G06F 3/00*   (2006.01)
  *G06F 16/00*   (2019.01)
  *G06F 3/06*   (2006.01)

(52) U.S. Cl.
  CPC .............. *G06F 3/065* (2013.01); *G06F 3/067* (2013.01); *G06F 3/0619* (2013.01)

(58) Field of Classification Search
  CPC ........ G06F 3/065; G06F 3/0619; G06F 3/067; G06F 16/128
  See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,304,889 B1 * | 4/2016 | Chen .................. G06F 11/3452 |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — David Yi
*Assistant Examiner* — Dustin B. Fulford
(74) *Attorney, Agent, or Firm* — Ryan, Mason & Lewis, LLP

(57) ABSTRACT

A first storage system in one embodiment participates in a cycle-based asynchronous replication process with multiple additional storage systems. The first storage system establishes replication sessions with respective ones of the additional storage systems for replication of source data. For each of multiple cycles, the first storage system captures a snapshot of the source data for a current cycle, generates differential data between the snapshot and a corresponding snapshot for a previous cycle, and transmits the differential data to the additional storage systems in their respective replication sessions. In conjunction with completion of transmission of the differential data to a given one of the additional storage systems, the corresponding replication session determines whether or not a snapshot of the source data for a subsequent cycle is available. If there is no such snapshot available, the replication session triggers capture of the snapshot of the source data for the subsequent cycle.

20 Claims, 6 Drawing Sheets

(56) References Cited

U.S. PATENT DOCUMENTS

| | | | |
|---|---|---|---|
| 9,606,870 | B1 | 3/2017 | Meiri et al. |
| 9,614,909 | B2* | 4/2017 | Yochai .................... G06F 16/10 |
| 9,716,754 | B2 | 7/2017 | Swift |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0042083 | A1* | 2/2013 | Mutalik ................ G06F 3/0604 |
| | | | 711/162 |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0202927 | A1 | 7/2016 | Klarakis et al. |
| 2016/0224259 | A1 | 8/2016 | Ahrens et al. |
| 2017/0083409 | A1* | 3/2017 | Iwasaki ............... G06F 11/1458 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

Itzikr, "DellEMC XtremIO X2 Tech Preview #2—Native Replication," https://xtremio.me/2017/05/09/dellemc-xtremio-x2-tech-preview-2-native-replication/, May 9, 2017, 8 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/662,708 filed in the name of Xianping Chen et al. dated Jul. 28, 2017 and entitled "Token-Based Data Flow Control in a Clustered Storage System."

U.S. Appl. No. 15/662,809 filed in the name of William Stronge et al. dated Jul. 28, 2017 and entitled "Automatic Verification of Asynchronously Replicated Data."

U.S. Appl. No. 15/662,833 filed in the name of William Stronge et al. dated Jul. 28, 2017 and entitled "Signature Generator for Use in Comparing Sets of Data in a Content Addressable Storage System."

U.S. Appl. No. 15/793,121 filed in the name of David Meiri et al. dated Oct. 25, 2017 and entitled "Opportunistic Compression of Replicated Data in a Content Addressable Storage System."

U.S. Appl. No. 15/793,147 filed in the name of Ernesto Blanco et al. dated Oct. 25, 2017 and entitled "Compression Signaling for Replication Process in a Content Addressable Storage System."

U.S. Appl. No. 15/872,553 filed in the name of Svetlana Kronrod et al. dated Jan. 16, 2018 and entitled "Storage System with Consistent Termination of Data Replication Across Multiple Distributed Processing Modules."

U.S. Appl. No. 15/824,536 filed in the name of Christopher Sayles et al. dated Nov. 28, 2017 and entitled "Storage System with Asynchronous Messaging Between Processing Modules for Data Replication."

U.S. Appl. No. 15/819,666 filed in the name of Xiangping Chen et al. dated Nov. 21, 2017 and entitled "Storage System Configured for Controlled Transition Between Asynchronous and Synchronous Replication Modes."

U.S. Appl. No. 15/876,433 filed in the name of Xiangping Chen et al. dated Jan. 22, 2018 and entitled "Storage System with Consistent Initiation of Data Replication Across Multiple Distributed Processing Modules."

* cited by examiner

STORAGE SYSTEM WITH CONCURRENT
FAN-OUT ASYNCHRONOUS REPLICATION
USING DECOUPLED REPLICATION
SESSIONS

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

Conventional approaches to data replication can be problematic under certain conditions. For example, when implementing concurrent fan-out asynchronous replication between a source site storage system and multiple target site storage systems, it may be necessary for the source site storage system to maintain different sets of source data snapshots for each of the target site storage systems, or to wait for all of the target site storage systems to complete a given replication cycle before commencing the next replication cycle with any of the target site storage systems. These and other similar data replication arrangements are inefficient and can adversely impact system performance.

SUMMARY

Illustrative embodiments provide techniques for concurrent fan-out asynchronous replication using decoupled replication sessions in an information processing system. Such embodiments can advantageously provide highly efficient asynchronous replication of a source production consistency group or other arrangement of source data from a first storage system to multiple additional storage systems.

Such arrangements can advantageously avoid the need for a source site storage system to maintain different sets of source data snapshots for each of a plurality of target site storage systems. In addition, a new replication cycle can be commenced with one of the target site storage systems without waiting for all of the target site storage systems to complete the current replication cycle. As a result, concurrent fan-out asynchronous replication can be completed more quickly than would otherwise be possible using conventional techniques. Storage system performance is thereby considerably improved.

These embodiments illustratively include a clustered implementation of a content addressable storage system having a distributed storage controller. Similar advantages can be provided in other types of storage systems.

In one embodiment, an apparatus comprises a first storage system configured to participate in a cycle-based asynchronous replication process with a plurality of additional storage systems. The first storage system is further configured to establish replication sessions with respective ones of the additional storage systems for replication of source data from the first storage system to each of the additional storage systems as part of the replication process. For each of a plurality of cycles of the cycle-based asynchronous replication process, the first storage system captures a snapshot of the source data for a current cycle, generates differential data between the snapshot and a corresponding snapshot for a previous cycle, and transmits the differential data to the additional storage systems in their respective replication sessions. In conjunction with completion of transmission of the differential data to a given one of the additional storage systems in its corresponding one of the replication sessions, that replication session is configured to determine whether or not a snapshot of the source data for a subsequent cycle is available, and responsive to the snapshot of the source data for the subsequent cycle not being available, to trigger capture of the snapshot of the source data for the subsequent cycle. If the snapshot of the source data for the subsequent cycle is already available, the replication session for the given additional storage system utilizes that available snapshot without triggering capture of any other snapshot for the subsequent cycle.

The multiple replication sessions of the first storage system illustratively operate at least in part in parallel with one another. However, each of the replication sessions proceeds with its transmission of the differential data for the current cycle independently of each of the other replication sessions. Such an arrangement is an example of what is also referred to herein as "decoupled" replication sessions.

By way of example, a first one of the replication sessions of the respective additional storage systems for which transmission of the differential data for the current cycle is completed may trigger capture of the snapshot for the subsequent cycle, and the first replication session and the other replication sessions of the respective additional storage systems all utilize that same snapshot for the subsequent cycle.

The replication sessions may therefore proceed to transmission of differential data for the subsequent cycle in the same order in which transmission of the differential data for the current cycle was completed for the replication sessions.

The first and additional storage systems illustratively comprise respective content addressable storage systems having respective sets of non-volatile memory storage devices. For example, the storage devices of the first and additional storage systems in such embodiments can be configured to collectively provide respective all-flash storage arrays. The first and additional storage systems may be associated with respective source and target sites of the replication process. For example, the source site may comprise a production site data center and each target site may comprise a disaster recovery site data center. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
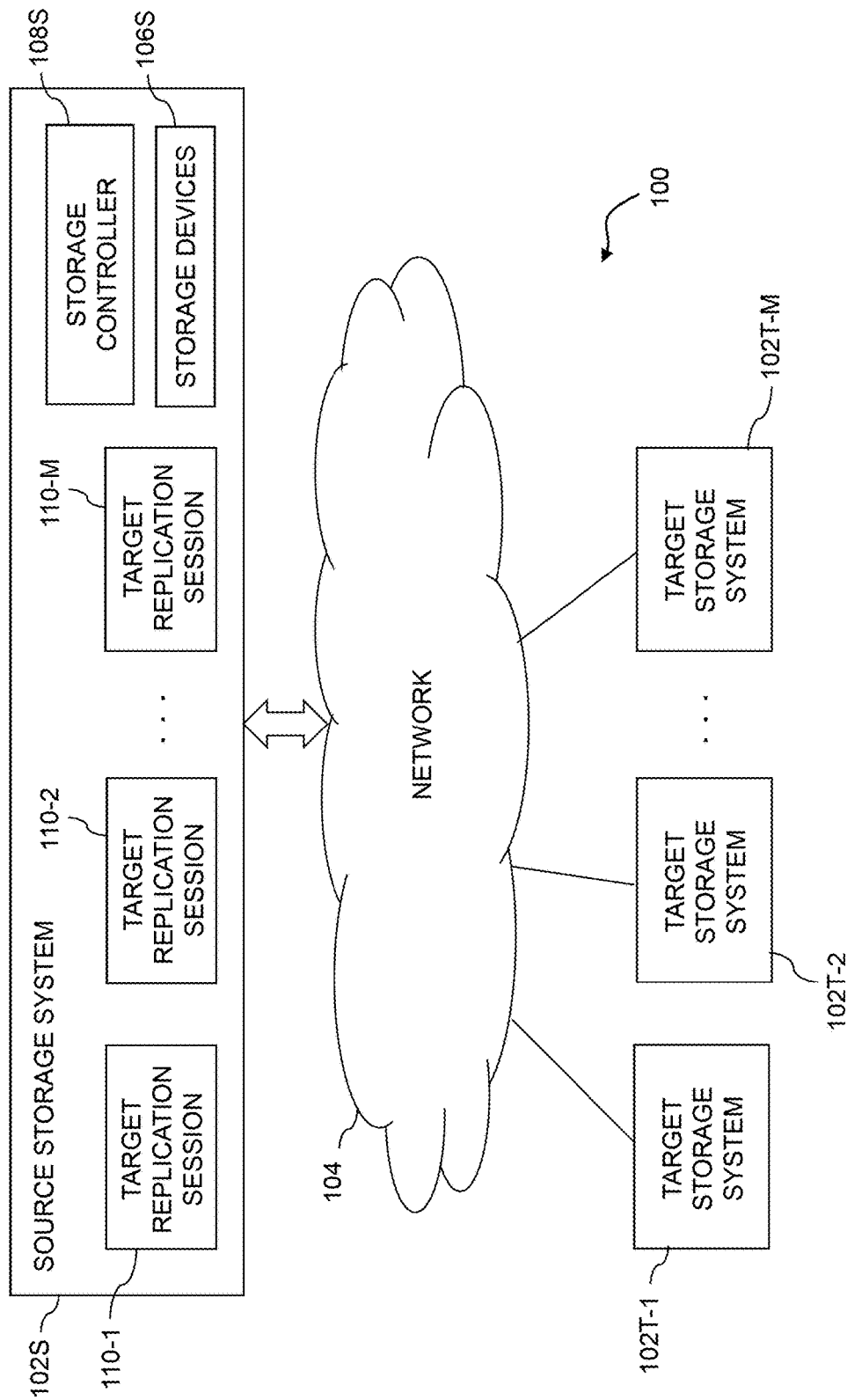
FIG. 1 is a block diagram of an information processing system comprising a first storage system configured to implement functionality for concurrent fan-out asynchronous replication to multiple additional storage systems using decoupled replication sessions in an illustrative embodiment.

FIG. 1 shows an information processing system 100 configured in accordance with an illustrative embodiment. The information processing system 100 comprises a source storage system 102S configured to communicate over a network 104 with a plurality of target storage systems 102T-1, 102T-2, ... 102T-M.

The source storage system 102S comprises a plurality of storage devices 106S and an associated storage controller 108S. Each of the target storage systems 102T similarly comprises a plurality of storage devices and an associated storage controller, although those target storage system components are not explicitly shown in the figure. Example implementations of source storage system 102S and the first target storage system 102T-1 will be described in more detail below in conjunction with FIG. 3.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage devices 106S illustratively comprise solid state drives (SSDs). Such SSDs are implemented using non-volatile memory (NVM) devices such as flash memory. Other types of NVM devices that can be used to implement at least a portion of the storage devices 106S include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 102S illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 102S in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The target storage systems 102T and their corresponding storage devices can be implemented in a manner similar to that described above for source storage system 102S and its corresponding storage devices 106S.

The information processing system 100 can include additional elements not explicitly shown in FIG. 1. For example, the system 100 can further include a computer system that includes multiple compute nodes. Such compute nodes can communicate over network 104 with one or more of the storage systems 102. The computer system may comprise an enterprise computer system or other arrangement of multiple compute nodes associated with respective users. The compute nodes of the computer system illustratively comprise respective processing devices of one or more processing platforms. For example, the compute nodes can comprise respective virtual machines (VMs) each having a processor and a memory, although numerous other configurations are possible.

The compute nodes can additionally or alternatively be part of cloud infrastructure such as an Amazon Web Services (AWS) system. Other examples of cloud-based systems that can be used to provide compute nodes and possibly other portions of system 100 include Google Cloud Platform (GCP) and Microsoft Azure.

The compute nodes may be viewed as examples of what are more generally referred to herein as "host devices" or simply "hosts." Such host devices are configured to write data to and read data from the source storage system 102S. The compute nodes and the storage system 102S may be implemented on a common processing platform, or on separate processing platforms. A wide variety of other types of host devices can be used in other embodiments.

The compute nodes in some embodiments illustratively provide compute services such as execution of one or more applications on behalf of each of one or more users associated with respective ones of the compute nodes.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The source storage system 102S is configured to participate in a cycle-based asynchronous replication process with the target storage systems 102T. As part of the cycle-based asynchronous replication process, the source storage system 102S establishes a plurality of replication sessions 110-1, 110-2, . . . 110-M with respective ones of the target storage systems 102T-1, 102T-2, . . . 102T-M for replication of source data from the source storage system 102S to each of the target storage systems 102T.

For each of a plurality of cycles of the cycle-based asynchronous replication process, the source storage system 102S captures a snapshot of the source data for a current cycle, generates differential data between the snapshot and a corresponding snapshot for a previous cycle, and transmit the differential data to the target storage systems 102T in their respective replication sessions 110.

Capturing a snapshot of the source data illustratively comprises generating at least one snapshot set for a designated source production consistency group of the source storage system 102S.

It should be noted that the term "snapshot" as used herein in intended to be broadly construed, so as to encompass, for example, a snapshot set ("snapset") or other arrangement of information providing a point-in-time view of the corresponding source or target data. A wide variety of other types of snapshots can be used in other embodiments.

In conjunction with completion of transmission of the differential data to a given one of the target storage systems 102T in its corresponding one of the replication sessions 110, that replication session is configured to determine whether or not a snapshot of the source data for a subsequent cycle is already available, and responsive to the snapshot of the source data for the subsequent cycle not being already available, to trigger capture of the snapshot of the source data for the subsequent cycle. Otherwise, responsive to the snapshot of the source data for the subsequent cycle already being available, the replication session for the given one of the target storage systems 102T utilizes that available snapshot without triggering capture of any other snapshot for the subsequent cycle.

The replication sessions 110 of the source storage system 102S operate at least in part in parallel with one another, and each of the replication sessions 110 proceeds with its transmission of the differential data for the current cycle to its corresponding one of the target storage systems 102T independently of each of the other replication sessions 110.

In the present embodiment, the first one of the replication sessions 110 of the respective target storage systems 102T for which transmission of the differential data for the current cycle is completed triggers capture of the snapshot for the subsequent cycle. The first replication session and the other replication sessions of the respective target storage systems 102T all utilize that same snapshot for the subsequent cycle.

The replication sessions 110 are illustratively configured to proceed to transmission of differential data for the subsequent cycle to their respective ones of the target storage systems 102T in the same order in which transmission of the differential data for the current cycle to the respective target storage systems 102T is completed for the replication sessions 110. Based at least in part on transmission of the differential data for the current cycle being completed for all of the replication sessions 110, the snapshot for the previous cycle may be deleted from the source storage system 102S.

These particular operations are presented by way of illustrative example only, and additional or alternative steps can be used in other embodiments. For example, one or more operations described as being performed by the individual target replication sessions 110 can instead be performed at least in part by the source storage system 102S outside of the target replication sessions 110.

As indicated above, the differential data transmitted to the target storage systems 102T in their respective replication sessions 110 is utilized to update corresponding snapshots of replicated source data in the respective target storage systems 102T.

The differential data is illustratively derived from snapshots of a designated source production consistency group or other source storage object of the source storage system 102S and is utilized to update corresponding designated target production consistency groups or other target storage objects of the respective target storage systems 102T in each of a plurality of replication cycles. The source and target storage objects may comprise respective source and target logical volumes of the source and target storage systems 102.

The source storage system 102S may be further configured to transmit a signature of the snapshot of the source data for the current cycle to the target storage systems 102T in their respective replication sessions 110 for use in verification of proper replication of the source data in the target storage systems 102T.

Further details regarding asynchronous replication processes suitable for use in illustrative embodiments herein can be found in U.S. patent application Ser. No. 15/662,809, filed Jul. 28, 2017 and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of asynchronous replication.

The asynchronous replication can be part of a replication process that includes both asynchronous and synchronous replication modes. For example, such a replication process can include a cycle-based asynchronous replication mode of the type described above as well as a synchronous replication mode in which host write operations directed to the source storage object are mirrored to the target storage object. A wide variety of other types of replication modes or processes can be used in other embodiments.

A given "replication process" as that term is broadly used herein may therefore include both asynchronous and synchronous replication modes as well as support for concurrent operation of such modes and separate operation of the individual modes. The term "mode" as used herein in conjunction with asynchronous or synchronous replication may therefore itself comprise a corresponding asynchronous or synchronous replication process.

In addition, a replication process in some embodiments can comprise a process for migrating data from one location to multiple other locations within the source storage system 102S. For example, a source storage object can be replicated to multiple target storage objects in conjunction with migration of the corresponding data from one storage pool to another storage pool, from one RAID group to another RAID group, or otherwise from one location to other locations within the storage system 102S. A replication process as that term is broadly used herein is therefore intended to encompass such arrangements in which, for example, a source storage object is deleted from the storage system 102S after its successful migration to multiple target storage objects.

In some embodiments, the storage controller 108S of the source storage system 102S comprises a replication engine that includes replication control logic, source-target object pairing control logic, and a globally-unique identifier (GUID) generator.

The replication control logic directs the overall replication process carried out between the source storage system 102S and the target storage systems 102T, and interacts with the source-target object pairing control logic and the GUID generator in directing the source storage system 102S to perform replication process operations such as those to be described below in conjunction with the flow diagram of FIG. 2.

The GUID generator in some embodiments randomly generates globally-unique identifiers or GUIDs that are utilized as pairing identifiers by the source-target object pairing control logic to pair source storage objects with respective target storage objects for replication purposes. The GUIDs are therefore examples of what are more generally referred to herein as "pairing identifiers."

In operation, the source storage system 102S under the direction of the replication control logic of the replication engine of the storage controller 108S is configured to obtain a pairing identifier from the GUID generator, and to pair a source storage object with target storage objects of the respective target storage systems 102T by associating the pairing identifier with the source storage object and the target storage objects utilizing the source-target object pairing control logic. The source storage system 102S is then able to replicate the source storage object to the target storage objects of the respective target storage systems 102T based at least in part on the pairing identifier.

The GUID is globally unique within the source storage system 102S, and within each of the target storage systems 102T. Thus, the term "global" in this embodiment refers to the entire storage space of a given one of the source and target storage systems 102. The GUID is illustratively implemented as a 16-byte randomly-generated identifier that serves as a pairing identifier. Pairing of the source and target storage objects via a pairing identifier ensures that a replication engine or other implementation of the replication control logic of the storage controller 108S can easily determine the appropriate locations from which to read source data of the source storage object and at which to write the source data to the target storage objects, thereby facilitating the replication process.

For example, in conjunction with replication of the source storage object to the target storage objects, the source storage system 102S may be further configured to utilize the source object pairing identifier to identify the particular target storage objects to which the source storage object is to be replicated.

Such operations can be repeated in multiple iterations for respective different portions of the source data of the source storage object, until all source data of the source storage object has been replicated to the target storage objects.

These and other operations carried out as part of the replication process of the source storage system 102S are illustratively performed under the control of the replication control logic of the storage controller 108S.

The above-described concurrent fan-out asynchronous replication functionality provides highly efficient asynchronous replication from source storage system 102S into the target storage systems 102T at least in part by decoupling differential data transmission in the target replication sessions 110 from snapshot creation for a subsequent cycle, thereby avoiding the need to create separate hierarchies of snapshots for each target.

Each of the replication sessions can proceed with its cycles independently, but all of the replication sessions utilize the same source snapshot or set of snapshots for each cycle. Such an arrangement avoids the need to create separate sets of snapshots for each of the target replication sessions 110. In addition, there is no need to wait for the slowest of the target replication sessions 110 to complete a current cycle before any of the target replication sessions can proceed to the subsequent cycle. Instead, the target replication sessions 110 can each proceed to the subsequent cycle in the same order in which they complete their respective differential data transmissions for the current cycle.

Although illustratively shown as being implemented within the source storage system 102S, the storage controller 108S in other embodiments can be implemented at least in part within an associated computer system, in another system component, or as a stand-alone component coupled to the network 104.

The source storage system 102S in the FIG. 1 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108S can be implemented in the form of one or more LXCs running on one or more VMs. Other arrangements of one or more processing devices of a processing platform can be used to implement the storage controller 108S. Other portions of the system 100 can similarly be implemented using one or more processing devices of at least one processing platform.

The source and target storage systems 102 can be implemented on respective distinct processing platforms, although numerous other arrangements are possible. For example, in some embodiments at least two of the source and target storage systems 102 may be implemented at least in part on the same processing platform. The source storage system 102S can therefore be implemented at least in part within at least one processing platform that implements at least a subset of the target storage systems 102T.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different ones of the target storage systems 102T to reside in different data centers than the source storage system 102S. Numerous other distributed implementations of the source and target storage systems 102 are possible.

It is to be appreciated that these and other features of illustrative embodiments are presented by way of example only, and should not be construed as limiting in any way.

Accordingly, different numbers, types and arrangements of system components such as source and target storage systems 102, network 104, storage devices 106S and storage controller 108S can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of information processing systems in which a source storage system is configured to perform concurrent fan-out asynchronous replication to multiple target storage systems. The source and target storage systems in the following description of the FIG. 2 process are referred to as simply "source" and "target" respectively.

Figure 2:
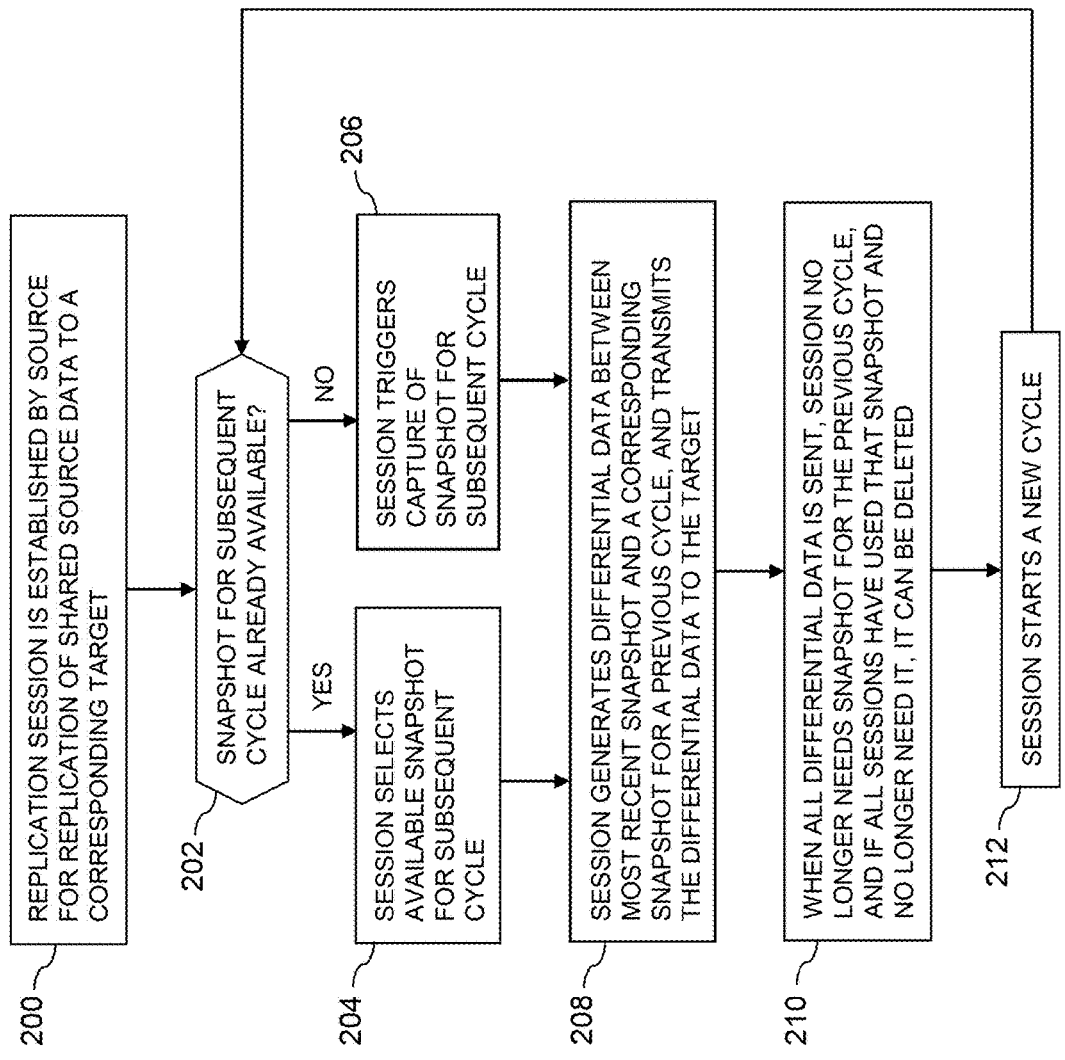
FIG. 2 is a flow diagram of a process for concurrent fan-out asynchronous replication using decoupled replication sessions in an illustrative embodiment.

In the FIG. 2 process, the steps are associated with a particular one of a plurality of replication sessions, such as one of the replication sessions 110, and it is assumed that similar steps are associated with each of the other replication sessions. The steps of the FIG. 2 process are performed primarily by the particular replication session at least in part under the control of a replication engine or other arrangement of replication control logic in a storage controller of the source storage system.

In step 200, the particular replication session is established by the source for replication of shared source data to a corresponding target in a cycle-based asynchronous replication process. The "shared" source data refers to source data that is designated for replication from the source to each of the targets. As indicated previously, in accordance with the cycle-based asynchronous replication process, differential data derived from snapshots of the source data is utilized to update target data in each of a plurality of replication cycles. The source and target data can comprise respective source and target logical volumes or other types of source and target storage objects. Additional or alternative replication modes can also be supported in a given embodiment, such as a synchronous replication mode in which host write operations directed to the source storage object are mirrored to the target storage objects.

In some embodiments, a replication process may start in one of the modes and transition to the other mode, and then back again. For example, the replication process may start in an asynchronous replication mode and transition to a synchronous replication mode and vice-versa. Such replication modes may alternatively be implemented as respective separate replication processes.

In step 202, the replication session determines whether or not a snapshot for a subsequent cycle is already available.

If there is a snapshot already available for the subsequent cycle, the replication session selects that available snapshot for the subsequent cycle in step 204.

If there is no snapshot already available for the subsequent cycle, the replication session triggers capture of a snapshot for the subsequent cycle in step 206.

In step 208, the replication session generates differential data between a most recent snapshot and a corresponding snapshot for a previous cycle, and transmits the differential data to the target. Successful completion of the transmission of the differential data to the target may be indicated to the replication session by receipt of an appropriate acknowledgement from the target that the differential data has been safely received. Other types of acknowledgements may be used in other embodiments.

In step 210, when all differential data has been sent successfully to the target, the replication session no longer needs the snapshot for the previous cycle. If all of the replication sessions have used that snapshot and no longer need it, the snapshot can be deleted. In implementing this step, each replication session may mark the snapshot as no longer needed, and the snapshot can then be deleted responsive to all of the replication sessions having marked the snapshot as no longer needed.

In step 212, the replication sessions starts a new cycle. The process then returns to step 202 to repeat steps 202 through 210 for the new cycle.

Like the particular replication session described above, each of the other replication sessions, after being established in its corresponding instance of step 200, also performs the remaining steps 202 through 212 of the FIG. 2 process. The process ends for any particular one of the replication sessions responsive to termination of that session by the source.

In the FIG. 2 embodiment, each replication session in its instance of step 208 compares two snapshots, one for a current cycle and one for a previous cycle. At any given point in time, different sessions may be at different cycles in the process. For example, assume there are three sessions, denoted Session A, Session B and Session C. Further assume that at the given point in time, Session A is comparing a snapshot for cycle 100 to a snapshot for cycle 99, while Session B is comparing the snapshot for cycle 99 to a snapshot for cycle 98, and Session C is comparing a snapshot for cycle 110 to a snapshot for cycle 109. Accordingly, at this given point in time, any snapshot for cycle 97 or below is no longer needed and can be deleted. The snapshot for cycle 98 is still in use only by Session B, and so that snapshot can be deleted after Session B successfully completes its transmission of the corresponding differential data.

As indicated previously, a replication process may transition from asynchronous replication to synchronous replication, and vice-versa. During at least a portion of such a transition, the storage system may concurrently operate in both asynchronous and synchronous replication modes, possibly using controlled transition functionality as disclosed in U.S. patent application Ser. No. 15/819,666, filed Nov. 21, 2017 and entitled "Storage System Configured for Controlled Transition Between Asynchronous and Synchronous Replication Modes," which is incorporated by reference herein.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing concurrent fan-out asynchronous replication. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different replication processes for respective different sets of replicated data or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108S that is configured to control performance of one or more steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108S, as well as other system components, may be implemented at least in part using processing devices of such processing platforms. For example, in a distributed implementation of the storage controller 108S, respective distributed modules of such a storage controller can be implemented in respective LXCs running on respective ones of the processing devices of a processing platform.

Figure 3:
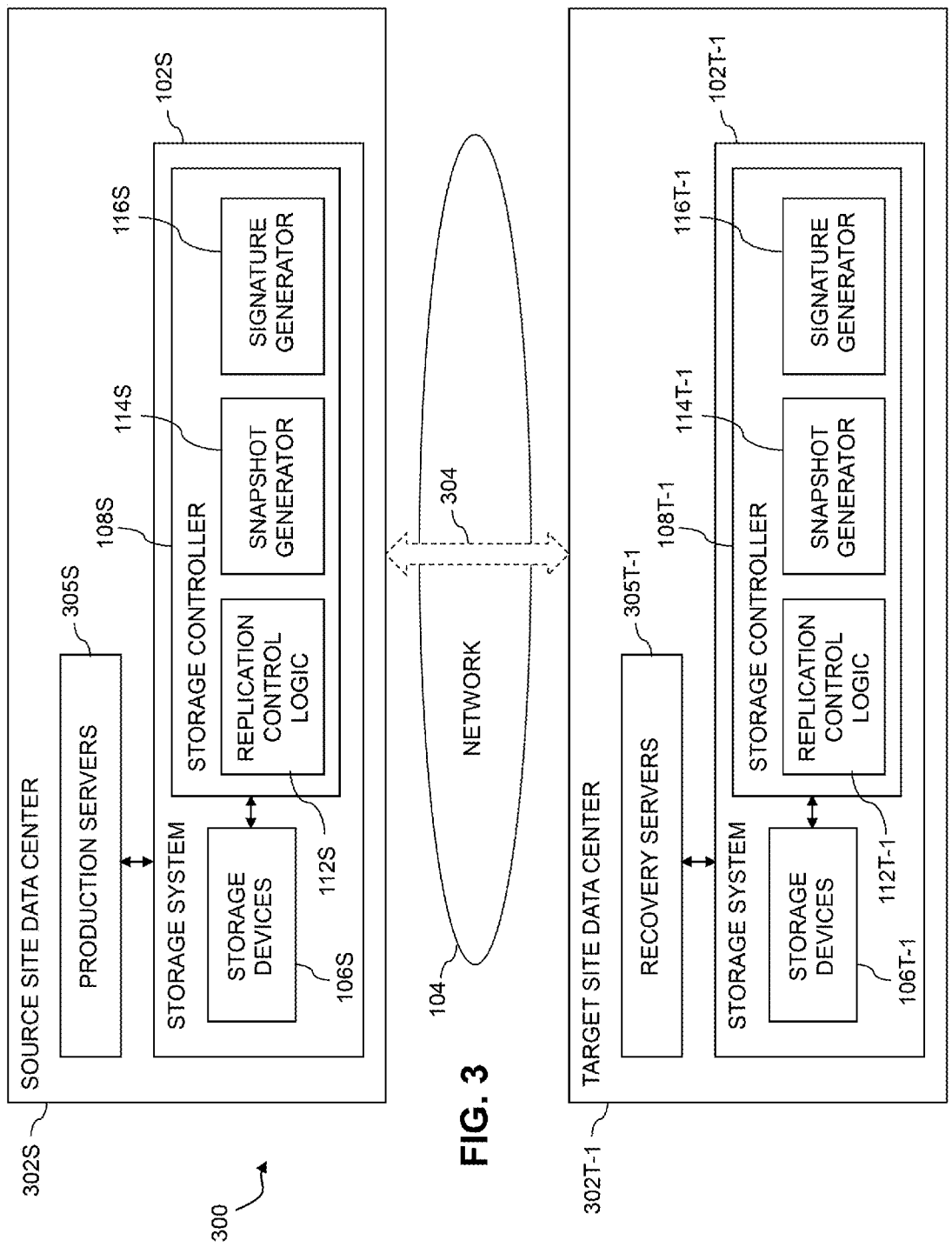
FIG. 3 shows an information processing system comprising source site and target site storage systems configured to participate in a cycle-based asynchronous replication process in an illustrative embodiment.

Referring now to FIG. 3, a portion 300 of information processing system 100 comprises a source site data center 302S that includes source storage system 102S and a first target site data center 302T-1 that includes the first target storage system 102T-1. As indicated previously, the storage systems 102 illustratively comprise respective content addressable storage systems having respective sets of non-volatile memory storage devices, although other types of storage systems can be used.

The source site data center 302S comprises storage system 102S having storage devices 106S and an associated storage controller 108S. The storage controller 108S comprises replication control logic 112S, snapshot generator 114S and signature generator 116S. The source site data center 302S further comprises a set of production servers 305S coupled to the storage system 102S.

The source site data center 302S is coupled via one or more communication channels 304 of the network 104 to the target site data center 302T-1 of the system 100. The target site data center 302T-1 comprises storage system 102T-1. The storage system 102T-1 comprises storage devices 106T-1 and an associated storage controller 108T-1. The storage controller 108T-1 comprises replication control logic 112T-1, snapshot generator 114T-1 and signature generator 116T-1. The target site data center 302T-1 further comprises a set of recovery servers 305T-1 coupled to the storage system 102T-1.

The target site data center 302T-1 comprising storage system 102T-1 is assumed to be one of a plurality of target site data centers 302T that comprise respective ones of the target storage systems 102T. Each of the additional target site data centers comprises a corresponding one of the additional storage systems 102T-2 through 102T-M of system 100, and such additional target site data centers and their corresponding storage systems are each assumed to be configured in a manner similar to that shown for target site data center 302T-1 and its corresponding storage system 102T-1 in the figure.

The source site data center 302S and the target site data centers 302T are examples of what are more generally referred to herein as respective ones of a "source site" and a "target site" of an information processing system. The source site data center 302S and the target site data centers 302T will therefore also be referred to herein as respective source and target sites 302 of the system 100. In some embodiments, each of the target sites 302T comprises a disaster recovery site data center and the source site 302S comprises a production site data center, although other arrangements are possible.

The source and target sites 302 may be implemented in respective distinct local and remote geographic locations, although it is also possible for such sites to be within a common facility or even implemented on a common processing platform.

It is assumed that data is replicated in system 100 from the source site 302S to the target sites 302T using a replication process that begins in an asynchronous replication mode, and subsequently transitions from the asynchronous replication mode to a synchronous replication mode. For example, the asynchronous replication mode may be used to replicate the bulk of a given set of data from the source site storage system 102S to the target site storage systems 102T. The mirroring functionality of the synchronous replication mode is then enabled. Other arrangements utilizing different replication modes and different transitions between the modes are possible.

The synchronous replication mode in some embodiments is illustratively configured to mirror data writes between the source and target storage systems 102. For example, when a host device writes data to the source storage system 102S, the source storage system 102S responds to the host device with an acknowledgement of successful storage in the source storage system 102S only after the source storage system 102S sends the data to the target storage systems 102T and receives an acknowledgement of successful storage back from each of the target storage systems 102T.

The asynchronous replication mode in some embodiments implements cycle-based asynchronous replication to periodically transfer data in multiple cycles from the source site 302S to the target sites 302T. The data replicated from the source site 302S to the target sites 302T can include all of the data stored in the storage system 102S, or only certain designated subsets of the data stored in the storage system 102S. Different replication processes of different types can be implemented for different parts of the stored data.

A given "replication process" as that term is broadly used herein may include both asynchronous and synchronous replication modes as well as support for concurrent operation of such modes and separate operation of the individual modes. The term "mode" as used herein in conjunction with asynchronous or synchronous replication may therefore itself comprise a corresponding asynchronous or synchronous replication process.

Figure 4:
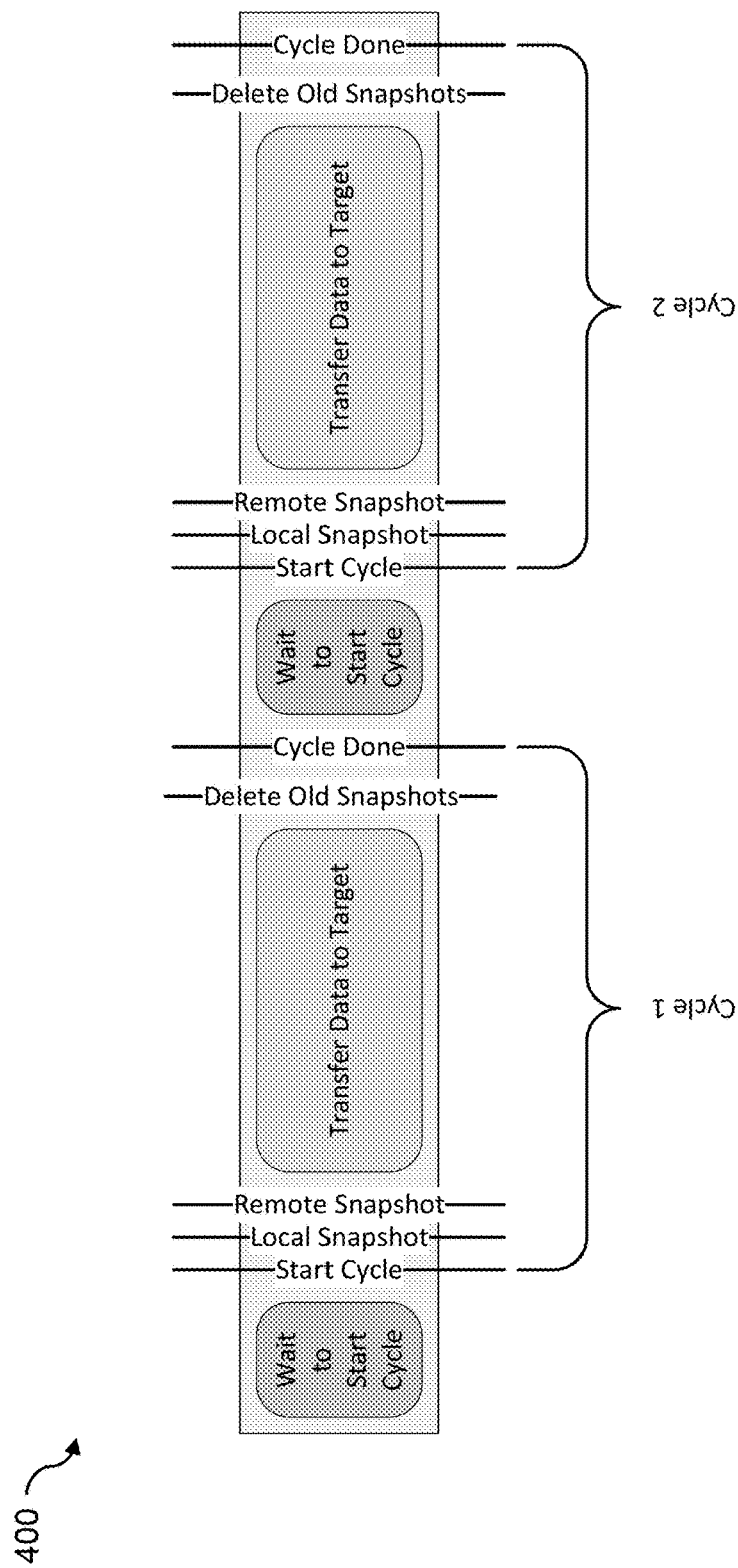
FIG. 4 shows an example of cycle-based asynchronous replication of source data between source site and target site storage systems in an illustrative embodiment.

FIG. 4 illustrates an example of cycle-based asynchronous replication of source data between source storage system 102S and target storage systems 102T in an illustrative embodiment. This particular example illustrates cycle-based asynchronous replication of data without automatic verification, although other embodiments can implement cycle-based asynchronous replication of data with automatic verification.

A portion 400 of the cycle-based asynchronous replication process illustrated in the figure includes two full cycles, denoted Cycle 1 and Cycle 2. At the beginning of each cycle, source site and target site snapshots are taken of the respective source and target data by respective source site and target site snapshot generators, such as snapshot generators 114S and 114T-1 of FIG. 3. The source site and target site snapshots in this embodiment are referred to in FIG. 4 as respective "local" and "remote" snapshots. The differential data or delta is then transferred from the source site to the target site, and any old snapshots that are no longer needed are deleted. There is then a waiting period before the start of the next cycle, as illustrated in the figure. Additional cycles of the process are assumed to be configured in a manner similar to that illustrated for Cycle 1 and Cycle 2 in the figure.

In this particular example, the local snapshot taken at the source site for Cycle 2 contains the same data used to generate the local snapshot for Cycle 1, plus whatever additional data was written by the source site production servers 305S to the source site storage system 102S during Cycle 1 and its post-cycle waiting period. The delta to be transferred from the source site to the target site during Cycle 2 is therefore generated as the differential data between the local snapshot for Cycle 1 and the local snapshot for Cycle 2. The target site receives this delta transferred during Cycle 2 and utilizes it to update its remote snapshot. As a result, at the end of Cycle 2, the local snapshot for Cycle 2 at the source site and the updated remote snapshot for Cycle 2 at the target site should be equal. This situation is confirmed by the target site using replicated data verification techniques, possibly based on signatures generated for the source and target snapshots by the signature generators 116S and 116T-1.

In some embodiments, automated verification of replicated data is implemented by modifying the cycle-based asynchronous replication process of FIG. 4 such that each cycle of the replication process includes a data verification phase located between the deletion of old snapshots and the end of the cycle.

In this data verification phase, a signature of a portion of a selected target site snapshot is compared to a signature of the same portion of the corresponding source site snapshot to confirm that the portions are the same. Only a portion of the selected target site snapshot is verified in each cycle, such that it takes multiple cycles of the cycle-based asynchronous replication process in order to complete the full verification of the selected target site snapshot. Each of the signatures may comprise a checksum, hash or other signature generation function of the particular portion of the target site or source site snapshot to which it corresponds. Combinations of checksums, hashes and other signature generation functions can be used in other embodiments. The exact signature algorithm used can vary depending upon the specific needs of a given implementation, as will be appreciated by those skilled in the art.

The FIG. 4 embodiment can therefore be configured to verify the transferred data by periodically selecting a target site snapshot and confirming that the data it contains is the same as that of its corresponding source site snapshot. However, this verification may proceed over multiple cycles of the cycle-based asynchronous replication process, with different portions of the target site and source site snapshots being compared based on their respective signatures in different data verification phases of the multiple cycles. The verification of the data transferred within a given one of the cycles of the FIG. 4 embodiment can be distributed over multiple ones of the cycles in a variety of different ways, as is described in more detail in the above-cited U.S. patent application Ser. No. 15/662,809, filed Jul. 28, 2017 and entitled "Automatic Verification of Asynchronously Replicated Data."

Referring again to the illustrative embodiment of FIG. 3, an exemplary cycle-based asynchronous replication process will now be described in more detail. The production servers 305S at the source site 302S illustratively run applications for users of the system 100. These servers are configured to store application data in the storage system 102S. This application data is illustratively part of the data stored in storage system 102S that is replicated from the source site 302S to the target sites 302T. The recovery servers 305T-1 at the target site 302T-1 are configured to take up the running of the applications for the users of the system 100 in the event of a disaster recovery or other recovery situation. The applications on the recovery servers 305T-1 of the target site 302T-1 are started using the data that has been replicated to the target site 302T-1 in the cycle-based asynchronous replication process.

The production servers 305S and recovery servers 305T of the respective source site 302S and target sites 302T illustratively comprise respective processing devices of one or more processing platforms of the corresponding source site 302S or target sites 302T. For example, these servers can comprise respective VMs each having a processor and a memory, although numerous other configurations are possible. At least portions of the source site 302S and target sites 302T can be implemented in cloud infrastructure such as an AWS system or another cloud-based system such as GCP or Microsoft Azure.

The storage systems 102 of the source and target sites 302 are configured in the present embodiment for automatic verification of asynchronously replicated data over multiple cycles of a cycle-based asynchronous replication process. This illustratively involves asynchronously replicating data from the storage devices 106S of the storage system 102S to the storage devices 106T of the storage systems 102T and automatically verifying the correctness of portions of the replicated data over multiple cycles.

As noted above, the storage systems 102 of the source and target sites 302 may comprise respective content addressable storage systems having respective sets of non-volatile memory storage devices.

Additionally or alternatively, the storage systems 102 of the source and target sites 302 may comprise respective clustered storage systems having respective sets of storage nodes each having a plurality of storage devices.

In some embodiments, the storage systems 102 illustratively comprise scale-out all-flash storage arrays such as XtremIO™ storage arrays from Dell EMC of Hopkinton, Mass. Other types of storage arrays, including by way of example Unity™, VNX® and Symmetrix VMAX® storage arrays also from Dell EMC, can be used to implement storage systems in other embodiments. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices 106 of respective storage systems 102 illustratively implement a plurality of logical units (LUNs) configured to store files, blocks, objects or other arrangements of data.

In the present embodiment, the storage system 102T-1 of the target site 302T-1 is configured to participate in a cycle-based asynchronous replication process with the storage system 102S of the source site 302S. This cycle-based asynchronous replication process is illustratively implemented in system 100 by cooperative interaction of the storage systems 102S and 102T-1 over network 104 using their respective replication control logic 112S and 112T-1, snapshot generators 114S and 114T-1, and signature generators 116S and 116T-1. Examples of cycles of an illustrative cycle-based asynchronous replication process of this type will be described in more detail below. The storage system 102T-1 of the target site 302T-1 is more particularly configured in this embodiment to receive from the storage system 102S of the source site 302S, in respective ones of a plurality of cycles of the cycle-based asynchronous replication process, corresponding sets of differential data representing respective deltas between pairs of source site snapshots for respective pairs of the cycles. The source site snapshots are generated by the snapshot generator 114S of the storage controller 108S.

The storage system 102T-1 of the target site 302T-1 illustratively utilizes the sets of differential data received in the respective ones of the cycles to update respective target site snapshots for those cycles. The target site snapshots are generated by the snapshot generator 114T-1 of the storage controller 108T-1.

Over multiple ones of the cycles, the storage system 102T-1 of the target site 302T-1 generates target site signatures for respective different portions of a designated one of the updated target site snapshots. The target site signatures are generated by the signature generator 116T-1 of the storage controller 108T-1. The storage system 102T-1 also receives from the storage system 102S of the source site 302S corresponding source site signatures for respective different portions of a designated one of the source site snapshots. The source site signatures are generated by the signature generator 116S of the storage controller 108S. The storage system 102T-1 compares the target site and source site signatures over the multiple cycles in order to verify that the designated target site and source site snapshots are equivalent.

The other target site storage systems 102T-2 through 102T-M are assumed to interact with the source site storage system 102S in a manner similar to that described above for the first target site storage system 102T-1.

The particular exemplary cycle-based asynchronous replication processes described above can be varied in other embodiments. Alternative synchronous replication processes may also be used. As mentioned previously, such processes are performed in respective asynchronous and synchronous replication modes of a replication process that incorporates both asynchronous and synchronous replication.

Each of the source and target sites 302 in the FIG. 3 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, the storage controllers 108 or various components thereof can each be implemented in the form of one or more LXCs running on one or more VMs. Other arrangements of one or more processing devices of a processing platform can be used to implement the storage controllers 108 and/or their respective components. Other portions of the system 100 can similarly be implemented using one or more processing devices of at least one processing platform.

The source and target sites 302 are illustratively implemented on respective distinct processing platforms, although numerous other arrangements are possible. For example, in some embodiments at least portions of the source and target sites 302 may be implemented on the same processing platform. The term "processing platform" as used herein is intended to be broadly construed so as to encompass, by way of illustration and without limitation, multiple sets of processing devices and associated storage systems that are configured to communicate over one or more networks.

Again, it is to be appreciated that these and other features of illustrative embodiments are presented by way of example only, and should not be construed as limiting in any way.

Accordingly, different numbers, types and arrangements of system components such as source and target sites 302 and their respective storage systems 102 and storage controllers 108 can be used in other embodiments. In these other embodiments, only subsets of these components, or additional or alternative sets of components, may be used, and such components may exhibit alternative functionality and configurations.

As noted above, in the some embodiments, the source storage system 102S and possibly one or more of the target storage systems 102T each comprise an XtremIO™ storage array or other type of content addressable storage system suitably modified to incorporate concurrent fan-out asynchronous replication techniques as disclosed herein.

An illustrative embodiment of such a content addressable storage system comprises a plurality of storage devices and an associated storage controller. The content addressable storage system may be viewed as a particular implementation of storage system 102S, and accordingly may be coupled to a computer system having one or more compute nodes via network 104 within information processing system 100. For the following description, source storage system 102S will be more specifically referred to as content addressable storage system 102S.

The storage devices 106S in such an embodiment are configured to store metadata pages and user data pages, and may also store additional information shown such as checkpoints and write journals. The metadata pages and the user data pages are illustratively stored in respective designated metadata and user data areas of the storage devices 106S. Accordingly, the metadata pages and user data pages may be viewed as corresponding to respective designated metadata and user data areas of the storage devices 106S.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages and the user data pages.

The user data pages are part of a plurality of LUNs configured to store files, blocks, objects or other arrangements of data, each also generally referred to herein as a "data item," on behalf of users associated with compute nodes. Each such LUN may comprise particular ones of the above-noted pages of the user data area. The user data stored in the user data pages can include any type of user data that may be utilized in the system 100. The term "user data" herein is therefore also intended to be broadly construed.

The content addressable storage system 102S in the present embodiment is configured to generate hash metadata providing a mapping between content-based digests of respective ones of the user data pages and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages. The hash metadata generated by the content addressable storage system 102S is illustratively stored as metadata pages in the metadata area. The generation and storage of the hash metadata is assumed to be performed under the control of the storage controller 108S.

Each of the metadata pages characterizes a plurality of the user data pages. For example, a given set of user data pages representing a portion of the user data pages illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106S.

Each of the metadata pages in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

The content addressable storage system 102S in the present embodiment is implemented as at least a portion of a clustered storage system and includes a plurality of storage nodes each comprising a corresponding subset of the storage devices 106S. Other clustered storage system arrangements comprising multiple storage nodes can be used in other embodiments. The system 100 can include additional storage nodes that are part of other clustered storage systems of the system 100, such as one or more of the target storage systems 102. Each of the storage nodes of the system 100 is assumed to be implemented using at least one processing device comprising a processor coupled to a memory.

The storage controller 108S of the content addressable storage system 102S is implemented in a distributed manner so as to comprise a plurality of distributed storage controller components implemented on respective ones of the storage nodes. The storage controller 108S may therefore be implemented in the form of what is more generally referred to herein as a "distributed storage controller." In subsequent description herein, the storage controller 108S may be more particularly referred to as a distributed storage controller.

Each of the storage nodes in this embodiment further comprises a set of processing modules configured to communicate over one or more networks with corresponding sets of processing modules on other ones of the storage nodes. The sets of processing modules of the storage nodes collectively comprise at least a portion of the distributed storage controller 108S of the content addressable storage system 102S.

The distributed storage controller 108S in the present embodiment is configured to implement concurrent fan-out asynchronous replication functionality of the type previously described in conjunction with FIGS. 1 through 4.

The modules of the distributed storage controller 108S in the present embodiment more particularly comprise different sets of processing modules implemented on each of the storage nodes. The set of processing modules of each of the storage nodes comprises at least a control module, a data module and a routing module. The distributed storage controller 108S further comprises one or more management ("MGMT") modules. For example, only a single one of the storage nodes may include a management module. It is also possible that management modules may be implemented on each of at least a subset of the storage nodes.

Each of the storage nodes of the content addressable storage system 102S therefore comprises a set of processing modules configured to communicate over one or more networks with corresponding sets of processing modules on other ones of the storage nodes. A given such set of processing modules implemented on a particular storage node illustratively includes at least one control module, at least one data module and at least one routing module, and possibly a management module. These sets of processing modules of the storage nodes collectively comprise at least a portion of the distributed storage controller 108S.

Communication links may be established between the various processing modules of the distributed storage controller 108S using well-known communication protocols such as IP and Transmission Control Protocol (TCP). For example, respective sets of IP links used in data transfer and corresponding messaging could be associated with respective different ones of the routing modules.

Ownership of a user data logical address space within the content addressable storage system 102S is illustratively distributed among the control modules.

It is desirable in these and other storage system contexts to implement concurrent fan-out asynchronous replication functionality across multiple distributed processing modules, such as the processing modules of the distributed storage controller 108S.

The management module of the storage controller 108S may include a replication engine or other arrangement of replication control logic that engages corresponding control logic instances in all of the control modules and routing modules in order to implement a replication process.

In some embodiments, the content addressable storage system 102S comprises an XtremIO™ storage array suitably modified to incorporate techniques for concurrent fan-out asynchronous replication as disclosed herein. In arrangements of this type, the control modules, data modules and routing modules of the distributed storage controller 108S illustratively comprise respective C-modules, D-modules and R-modules of the XtremIO™ storage array. The one or more management modules of the distributed storage controller 108S in such arrangements illustratively comprise a system-wide management module ("SYM module") of the XtremIO™ storage array, although other types and arrangements of system-wide management modules can be used in other embodiments. Accordingly, concurrent fan-out asynchronous replication functionality in some embodiments is implemented under the control of at least one system-wide management module of the distributed storage controller 108S, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, assume that the source and target storage systems 102 are each configured to store logical blocks of user data in the form of 16 kilobyte (KB) pages. The division of a storage space into slices can utilize a 10-bit portion of the logical page address to divide the storage space into 1024 slices. The 10-bit portion of the logical page address illustratively comprises bits 8 through 17 of the logical page address, which is also referred to as a logical x-page address or LXA address. Since each page in this example is 16 KB, in traversing the address space of a logical volume, every 256*16 KB=4 MB will begin a new slice, and after 1024*4 MB=4 GB the traversal returns to the original first slice.

If the 1024 slices in this particular example are distributed evenly across the C-modules of a given one of the source and target storage systems 102, and there are a total of 16 C-modules in the given source or target storage system, each of the C-modules "owns" 1024/16=64 slices. In such an arrangement, different ones of the slices are assigned to different ones of the control modules such that control of the slices within the storage controller 108 of the given source or target storage system 102 is substantially evenly distributed over the control modules of the storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 102S each illustratively comprise one or more IO operations directing that at least one data item of the storage system 102S be written to in a particular manner. A given write request is illustratively received in the storage system 102S from a host device, illustratively one of the compute nodes. In some embodiments, a write request is received in the distributed storage controller 108S of the storage system 102S, and directed from one processing module to another processing module of the distributed storage controller 108S. For example, a received write request may be directed from a routing module of the distributed storage controller 108S to a particular control module of the distributed storage controller 108S. Other arrangements for receiving and processing write requests from one or more host devices can be used.

In the XtremIO™ context, the C-modules, D-modules and R-modules of the storage nodes communicate with one another over a high-speed internal network such as an InfiniBand network. The C-modules, D-modules and R-modules coordinate with one another to accomplish various IO processing tasks.

The write requests from the host devices identify particular data pages to be written in the storage system 102S by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 102S utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 102S.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106S. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 102S correspond to respective physical blocks of a physical layer of the storage system 102S. The user data pages of the logical layer are organized by LBA and have reference via respective content-based signatures to particular physical blocks of the physical layer.

Each of the physical blocks has an associated reference count that is maintained within the storage system 102S. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules described in conjunction with the present embodiment is presented by way of example only. Numerous alternative arrangements of processing modules of a distributed storage controller may be used to implement concurrent fan-out asynchronous replication functionality in a clustered storage system in other embodiments.

Additional examples of content addressable storage functionality implemented in some embodiments by control modules, data modules, routing modules and one or more management modules of distributed storage controller 108S can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of content addressable storage systems or other types of storage systems with concurrent fan-out asynchronous replication functionality as disclosed herein can provide a number of significant advantages relative to conventional arrangements.

For example, some embodiments can advantageously provide highly efficient asynchronous replication of a source production consistency group or other arrangement of source data from a first storage system to multiple additional storage systems.

Such arrangements can advantageously avoid the need for a source site storage system to maintain different sets of source data snapshots for each of a plurality of target site storage systems. In addition, a new replication cycle can be commenced with one of the target site storage systems without waiting for all of the target site storage systems to complete the current replication cycle. As a result, concurrent fan-out asynchronous replication can be completed more quickly than would otherwise be possible using conventional techniques. Storage system performance is thereby considerably improved.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
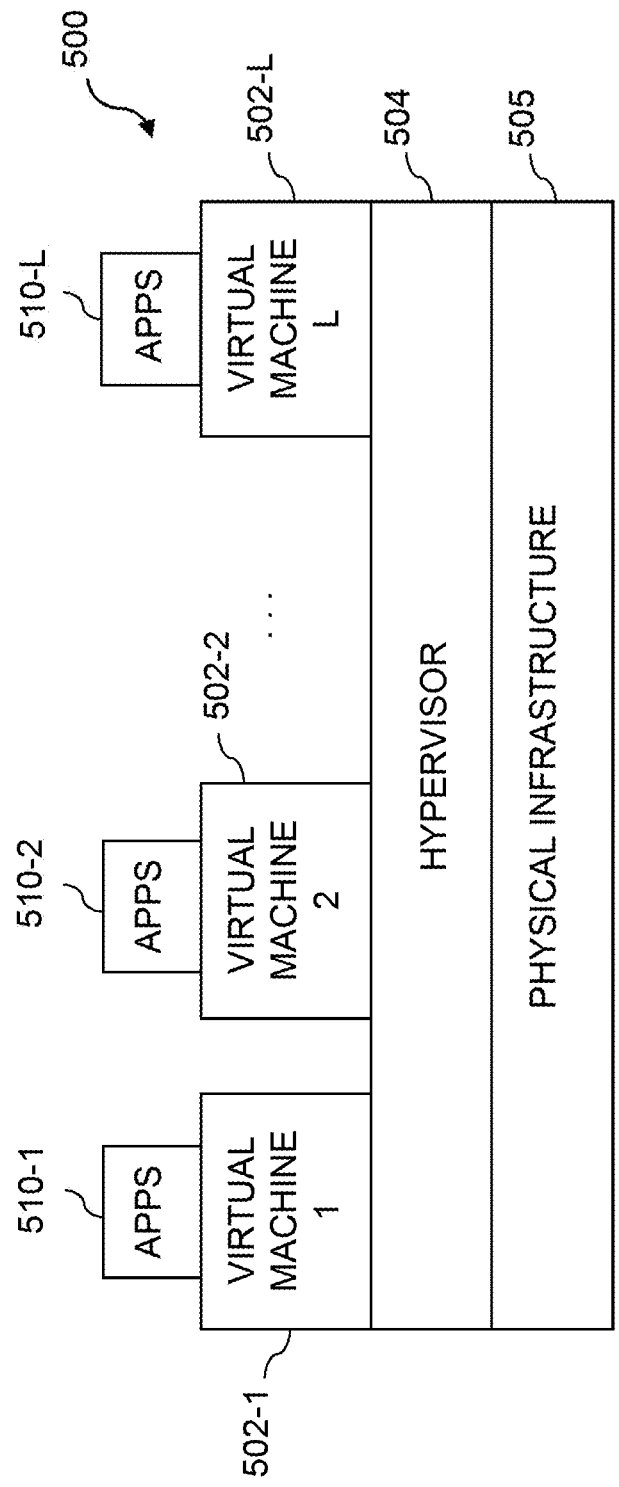
FIGS. 5 and 6 show examples of processing platforms that may be utilized to implement at least a portion of an information processing system in illustrative embodiments.
Figure 6:
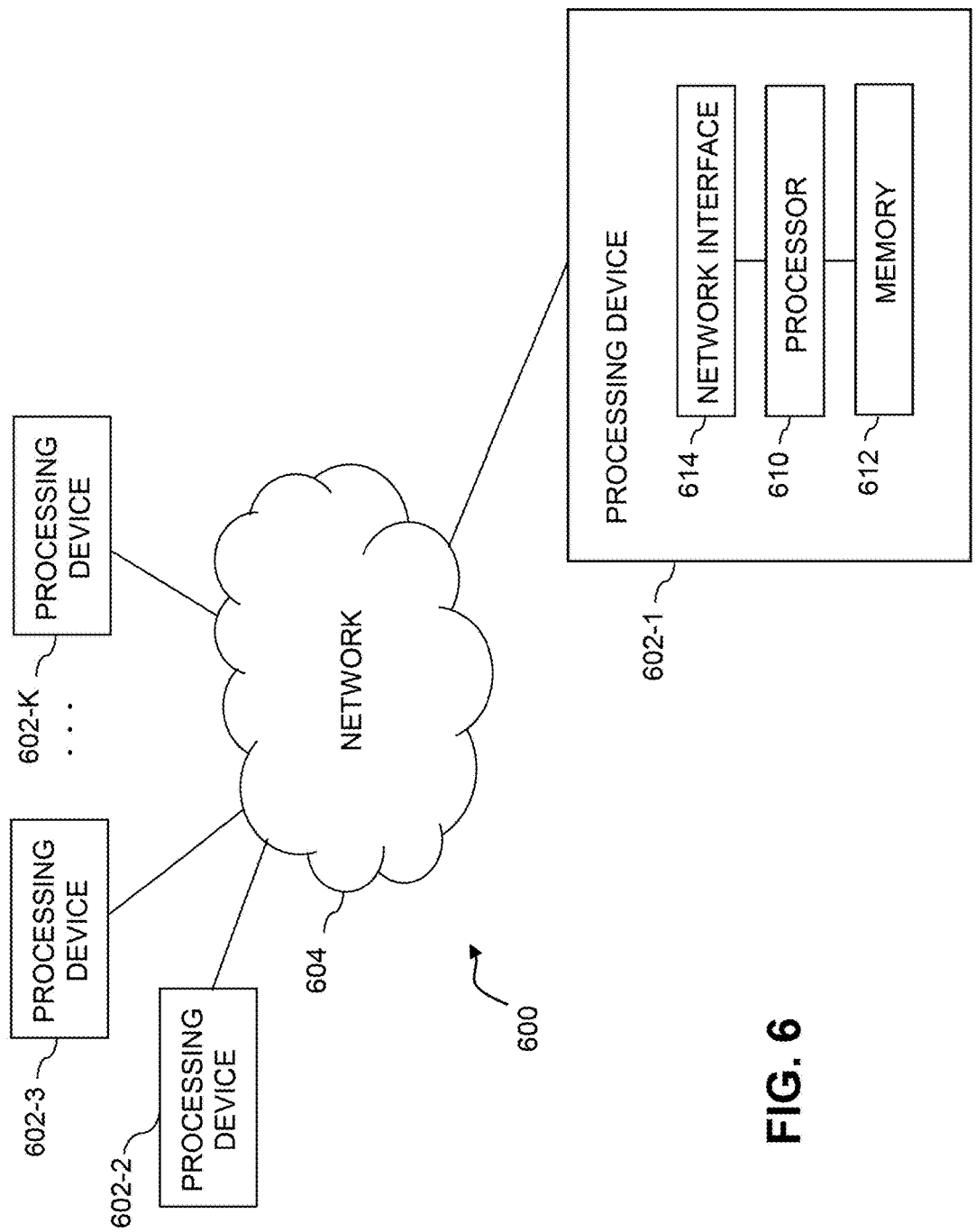

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604. The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk, an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controller 108S of source storage system 102S are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, replication processes, replication engines and associated replication control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a first storage system comprising a plurality of storage devices and a storage controller;
the first storage system being configured to participate in a cycle-based asynchronous replication process with a plurality of additional storage systems;
the cycle-based asynchronous replication process utilizing a concurrent fan-out replication arrangement in which:
(i) the first storage system operates as a source relative to the additional storage systems operating as respective targets; and
(ii) the first storage system carries out distinct replication sessions with respective ones of the additional storage systems;
wherein the first storage system is further configured:
to establish the replication sessions with the respective ones of the additional storage systems for replication of source data from the first storage system to each of the additional storage systems as part of the replication process; and
for each of a plurality of cycles of the cycle-based asynchronous replication process:
to capture a snapshot of the source data for a current cycle;
to generate differential data between the snapshot and a corresponding snapshot for a previous cycle; and
to transmit the differential data to the additional storage systems in their respective replication sessions;
wherein the replication sessions operate at least in part in parallel with one another and each of the replication sessions proceeds with its transmission of the differential data for the current cycle independently of each of the other replication sessions;
wherein in conjunction with completion of transmission of the differential data to a given one of the additional storage systems in its corresponding one of the replication sessions, that replication session is configured:
to determine whether or not a snapshot of the source data for a subsequent cycle is available as a result of capture of the snapshot of the source data for the subsequent cycle having been previously triggered by another one of the replication sessions; and responsive to the snapshot of the source data for the subsequent cycle not being available, to trigger capture of the snapshot of the source data for the subsequent cycle;

wherein the subsequent cycle is commenced with one of the additional storage systems without waiting for all of the additional storage systems to complete the current cycle; and wherein the first storage system is implemented using at least one processing device comprising a processor coupled to a memory.

2. The apparatus of claim 1 wherein responsive to the snapshot of the source data for the subsequent cycle being available, the replication session for the given additional storage system utilizes that available snapshot without triggering capture of any other snapshot for the subsequent cycle.

3. The apparatus of claim 1 wherein capturing a snapshot of the source data comprises generating at least one snapshot set for a designated source production consistency group.

4. The apparatus of claim 1 wherein a first one of the replication sessions of the respective additional storage systems for which transmission of the differential data for the current cycle is completed triggers capture of the snapshot for the subsequent cycle, and the first replication session and the other replication sessions of the respective additional storage systems all utilize that same snapshot for the subsequent cycle.

5. The apparatus of claim 1 wherein the replication sessions proceed to transmission of differential data for the subsequent cycle in an order in which transmission of the differential data for the current cycle is completed for the replication sessions.

6. The apparatus of claim 1 wherein based at least in part on transmission of the differential data for the current cycle being completed for all of the replication sessions, the snapshot for the previous cycle is deleted.

7. The apparatus of claim 1 wherein the differential data transmitted to the additional storage systems in their respective replication sessions is utilized to update corresponding snapshots of replicated source data in the respective additional storage systems.

8. The apparatus of claim 1 wherein the first storage system is further configured to transmit a signature of the snapshot of the source data for the current cycle to the additional storage systems in their respective replication sessions for use in verification of proper replication of the source data in the additional storage systems.

9. The apparatus of claim 1 wherein the first and additional storage systems comprise respective content addressable storage systems having respective sets of non-volatile memory storage devices.

10. The apparatus of claim 1 wherein the first and additional storage systems comprise respective clustered storage systems having respective sets of storage nodes each having a plurality of storage devices.

11. The apparatus of claim 1 wherein the first and additional storage systems are associated with respective source and target sites of the replication process and wherein the source site comprises a production site data center and each target site comprises a disaster recovery site data center.

12. The apparatus of claim 1 wherein the first storage system comprises a plurality of storage nodes each comprising one or more of the storage devices and wherein each of the storage nodes of the first storage system further comprises a set of processing modules configured to communicate over one or more networks with corresponding sets of processing modules on other ones of the storage nodes, the sets of processing modules of the storage nodes of the first storage system collectively comprising at least a portion of the storage controller of the first storage system.

13. The apparatus of claim 12 wherein each of the sets of processing modules of the first storage system comprises one or more control modules, one or more routing modules and one or more data modules, and wherein at least one of the sets of processing modules comprises a management module.

14. A method comprising:

establishing replication sessions in a first storage system with respective ones of a plurality of additional storage systems for replication of source data from the first storage system to each of the additional storage systems as part of a cycle-based asynchronous replication process;

the cycle-based asynchronous replication process utilizing a concurrent fan-out replication arrangement in which:

(i) the first storage system operates as a source relative to the additional storage systems operating as respective targets; and (ii) the first storage system carries out the established replication sessions as distinct replication sessions with respective ones of the additional storage systems; and for each of a plurality of cycles of the cycle-based asynchronous replication process, the first storage system:

capturing a snapshot of the source data for a current cycle;

generating differential data between the snapshot and a corresponding snapshot for a previous cycle; and transmitting the differential data to the additional storage systems in their respective replication sessions;

wherein the replication sessions operate at least in part in parallel with one another and each of the replication sessions proceeds with its transmission of the differential data for the current cycle independently of each of the other replication sessions;

wherein in conjunction with completion of transmission of the differential data to a given one of the additional storage systems in its corresponding one of the replication sessions, the method for that replication session further comprises:

determining whether or not a snapshot of the source data for a subsequent cycle is available as a result of capture of the snapshot of the source data for the subsequent cycle having been previously triggered by another one of the replication sessions; and responsive to the snapshot of the source data for the subsequent cycle not being available, triggering capture of the snapshot of the source data for the subsequent cycle;

wherein the subsequent cycle is commenced with one of the additional storage systems without waiting for all of the additional storage systems to complete the current cycle; and wherein the method is implemented by at least one processing device comprising a processor coupled to a memory.

15. The method of claim 14 wherein the replication sessions proceed to transmission of differential data for the subsequent cycle in an order in which transmission of the differential data for the current cycle is completed for the replication sessions.

16. A computer program product comprising a non-transitory processor-readable storage medium having stored therein program code of one or more software programs, wherein the program code when executed by at least one processing device of a first storage system causes the first storage system:

to establish replication sessions with respective ones of a plurality of additional storage systems for replication of source data from the first storage system to each of the additional storage systems as part of a cycle-based asynchronous replication process;

the cycle-based asynchronous replication process utilizing a concurrent fan-out replication arrangement in which:

(i) the first storage system operates as a source relative to the additional storage systems operating as respective targets; and (ii) the first storage system carries out the established replication sessions as distinct replication sessions with respective ones of the additional storage systems; and for each of a plurality of cycles of the cycle-based asynchronous replication process:

to capture a snapshot of the source data for a current cycle;

to generate differential data between the snapshot and a corresponding snapshot for a previous cycle; and to transmit the differential data to the additional storage systems in their respective replication sessions;

wherein the replication sessions operate at least in part in parallel with one another and each of the replication sessions proceeds with its transmission of the differential data for the current cycle independently of each of the other replication sessions;

wherein in conjunction with completion of transmission of the differential data to a given one of the additional storage systems in its corresponding one of the replication sessions, that replication session is configured:

to determine whether or not a snapshot of the source data for a subsequent cycle is available as a result of capture of the snapshot of the source data for the subsequent cycle having been previously triggered by another one of the replication sessions; and responsive to the snapshot of the source data for the subsequent cycle not being available, to trigger capture of the snapshot of the source data for the subsequent cycle; and wherein the subsequent cycle is commenced with one of the additional storage systems without waiting for all of the additional storage systems to complete the current cycle.

17. The computer program product of claim 16 wherein the replication sessions proceed to transmission of differential data for the subsequent cycle in an order in which transmission of the differential data for the current cycle is completed for the replication sessions.

18. The computer program product of claim 16 wherein based at least in part on transmission of the differential data for the current cycle being completed for all of the replication sessions, the snapshot for the previous cycle is deleted.

19. The computer program product of claim 16 wherein the differential data transmitted to the additional storage systems in their respective replication sessions is utilized to update corresponding snapshots of replicated source data in the respective additional storage systems.

20. The computer program product of claim 16 wherein the first storage system is further configured to transmit a signature of the snapshot of the source data for the current cycle to the additional storage systems in their respective replication sessions for use in verification of proper replication of the source data in the additional storage systems.

* * * * *